(12) United States Patent
Shen et al.

(10) Patent No.: US 10,491,008 B2
(45) Date of Patent: Nov. 26, 2019

(54) PRE-CHARGING A CAPACITOR BANK

(71) Applicant: General Electric Company,
Schenectady, NY (US)

(72) Inventors: Longhui Shen, Shanghai (CN);
Xianfeng Zhang, Shanghai (CN)

(73) Assignee: General Electric Company,
Schenectady, NY (US)

( * ) Notice: Subject to any disclaimer, the term of this patent is extended or adjusted under 35 U.S.C. 154(b) by 427 days.

(21) Appl. No.: 15/293,392

(22) Filed: Oct. 14, 2016

(65) Prior Publication Data

US 2017/0117722 A1    Apr. 27, 2017

(30) Foreign Application Priority Data

Oct. 26, 2015 (CN) .......................... 2015 1 0976909

(51) Int. Cl.
| | |
|---|---|
| *H02J 7/00* | (2006.01) |
| *F03D 9/11* | (2016.01) |
| *F03D 9/25* | (2016.01) |
| *H02K 7/18* | (2006.01) |
| *H02M 1/08* | (2006.01) |
| *H02P 27/08* | (2006.01) |
| *F03D 7/02* | (2006.01) |
| *H02J 7/34* | (2006.01) |

(52) U.S. Cl.
CPC .............. *H02J 7/0021* (2013.01); *F03D 9/11* (2016.05); *F03D 9/25* (2016.05); *H02J 7/0081* (2013.01); *H02K 7/1838* (2013.01); *H02M 1/08* (2013.01); *H02P 27/08* (2013.01); *F03D 7/0224* (2013.01); *H02J 7/345* (2013.01)

(58) Field of Classification Search
USPC .................................................. 320/166–167
See application file for complete search history.

(56) References Cited

U.S. PATENT DOCUMENTS

| | | |
|---|---|---|
| 5,619,076 A | 4/1997 | Layden et al. |
| 5,852,559 A | 12/1998 | Li |
| 5,946,244 A | 8/1999 | Manning |
| 6,153,851 A | 11/2000 | Schneider |
| 6,490,207 B2 | 12/2002 | Manning |
| 6,563,449 B2 | 5/2003 | Takata et al. |
| 7,519,135 B2 | 4/2009 | Staszewski et al. |
| 7,547,353 B2 | 6/2009 | Reyes et al. |

(Continued)

FOREIGN PATENT DOCUMENTS

| | | |
|---|---|---|
| CN | 201409090 | 2/2010 |
| CN | 103457264 | 12/2013 |

(Continued)

*Primary Examiner* — Samuel Berhanu
(74) *Attorney, Agent, or Firm* — Dority & Manning, P.A.

(57) ABSTRACT

Systems and methods of pre-charging a capacitor bank are provided. In particular, a power switch and a current limiting device can be coupled in series between a power source and a capacitor bank. Operation of the power switch can be controlled to limit a peak charging current applied to the capacitor bank during a pre-charging process. In this manner, a duty cycle of a pulse signal can be modified based at least in part on a measured current flowing into the current limiting device. In addition, a voltage at the capacitor bank can be monitored, and the pre-charging process can be ceased when the monitored voltage reaches a threshold.

17 Claims, 6 Drawing Sheets

(56) References Cited

U.S. PATENT DOCUMENTS

| | | |
|---|---|---|
| 7,555,912 B2 | 7/2009 | Schnetzka et al. |
| 7,742,885 B2 * | 6/2010 | Oohasi ................ B60L 3/0038 |
| | | 702/63 |
| 7,961,131 B2 | 6/2011 | Craninckx |
| 8,223,515 B2 | 7/2012 | Abolhassani et al. |
| 8,368,409 B2 | 2/2013 | Mueck et al. |
| 8,816,631 B2 | 8/2014 | Wei et al. |
| 8,854,059 B2 | 10/2014 | Cormier, Jr. |
| 8,896,251 B2 | 11/2014 | Le et al. |
| 8,896,263 B2 | 11/2014 | Riggio et al. |
| 8,953,296 B2 | 2/2015 | Weiss et al. |
| 2002/0130645 A1 * | 9/2002 | Tsai ........................ G05F 1/24 |
| | | 323/274 |
| 2007/0194759 A1 * | 8/2007 | Shimizu ................ H02J 7/0016 |
| | | 320/166 |
| 2009/0009145 A1 * | 1/2009 | Odajima ............... H02J 7/0091 |
| | | 320/166 |
| 2010/0315048 A1 | 12/2010 | De Sousa et al. |
| 2014/0139194 A1 * | 5/2014 | Dinand Da Silva .. H02J 7/0052 |
| | | 320/166 |
| 2014/0167513 A1 | 6/2014 | Chang et al. |
| 2014/0244082 A1 | 8/2014 | Caron |

FOREIGN PATENT DOCUMENTS

| | | |
|---|---|---|
| EP | 1076393 | 2/2001 |
| EP | 2644436 | 10/2013 |

* cited by examiner

PRE-CHARGING A CAPACITOR BANK

FIELD OF THE INVENTION

The present subject matter relates generally to wind turbines and more particularly to systems and methods of pre-charging a capacitor bank within a wind turbine.

BACKGROUND OF THE INVENTION

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy from wind using known foil principles and transmit the kinetic energy through rotational energy to turn a shaft coupling the rotor blades to a gearbox, or if a gearbox is not used, directly to the generator. The generator then converts the mechanical energy to electrical energy that may be deployed to a utility grid.

During operation of a wind turbine, various components of the wind turbine are subjected to various loads due to the aerodynamic wind loads acting on the blade. The blade loading is dependent on the wind speed, tip speed ratio and/or pitch setting of the blade. Tip speed ratio is the ratio of the rotational velocity of the blade tip to wind speed. It can be desirable to adjust operation of the wind turbine based on signals indicative of tip speed ratio (e.g. various speed readings) to adjust loading of the rotor blades of the wind turbine and/or to increase energy production of the wind turbine.

To reduce rotor blade loading, various methods and apparatus have been developed to allow the rotor blades to shed a portion of the loads experienced thereby. Such methods and apparatus include, for example, pitching the rotor blades and/or reducing generator torque during operation. Accordingly, many wind turbines include a wind turbine controller that can operate the wind turbine in various ways based on the tip speed ratio wind turbine loading. For instance, under various operating conditions, the wind turbine can adjust the torque of a generator and/or the pitch angle of the rotor blades to adjust the tip speed ratio to meet a desired tip speed ratio setpoint to increase energy capture by the wind turbine.

The pitch angle of a rotor blade can be controlled, for instance, using a wind pitch adjustment motor. The wind pitch adjustment motor can be a direct current (DC) motor driven by a DC/DC converter. Typically, a wind pitch adjustment motor includes a DC source, a control circuit, an inverter bridge, and/or a DC bus capacitor bank having one or more capacitor devices. Due to the high capacitance of the capacitor bank, a pre-charging circuit can be used in conjunction with a bypass contactor to limit the magnitude of an inrush current into the capacitor bank.

Conventional pre-charge circuits can include high power resistors, positive temperature coefficient (PTC) thermistors, transformers, switching current sources, linear current sources, or other circuit configurations to limit the current applied to the capacitor bank. However, such pre-charging techniques can be inefficient, time-consuming, and/or difficult to implement.

Accordingly, there is a need for systems and methods of pre-charging a capacitor bank simple, efficient, and controllable manner.

BRIEF DESCRIPTION OF THE INVENTION

Aspects and advantages of embodiments of the present disclosure will be set forth in part in the following description, or may be learned from the description, or may be learned through practice of the embodiments.

One example aspect of the present disclosure is directed to a system for pre-charging a capacitor bank. The system includes a power switch coupled in series to a direct current input source, and a current limiting device coupled in series between the power switch and a capacitor bank comprising one or more capacitor devices. The system further includes a first control device configured to control the operation of the power switch by receiving one or more signals indicative of a charge current associated with the capacitor bank, and controlling operation of the power switch based at least in part on the charge current. The system further includes a second control device configured to determine a capacitor bank voltage at the capacitor bank and to control operation of the first control device based at least in part on the determined capacitor bank voltage.

Another example aspect of the present disclosure is directed to a control method of pre-charging a capacitor bank comprising one or more capacitor devices. The capacitor bank is coupled in series with a power switch and a current limiting device between a power source and the capacitor bank. The method includes applying, by the power source, a direct current input for use in pre-charging the capacitor bank. The method further includes monitoring a magnitude of the direct current flowing into the current limiting device. The method further includes selectively controlling operation of the power switch such that, when the magnitude of direct current reaches a threshold current value, the power switch is turned off. The method further includes monitoring a voltage at the capacitor bank. The method further includes, when the voltage at the capacitor bank reaches a threshold voltage value, ceasing pre-charging the capacitor bank such that the current limiting device is bypassed.

Yet another example aspect of the present disclosure is directed to a wind turbine system. The wind turbine system includes a rotor, a stator, and a pitch angle adjustment motor configured to control a pitch angle of one or more rotor blades associated with the wind turbine system. The wind turbine system further includes one or more control devices configured to pre-charge a capacitor bank associated with the pitch angle adjustment motor by initiating a pre-charging process for the capacitor bank, monitoring a magnitude of direct current flowing into a current limiting device, the current limiting device being coupled in series between the capacitor bank and a power source, selectively controlling operation of a power switch such that, when the magnitude of direct current reaches a threshold current value, the power switch is turned off, thereby reducing an amount of current applied to the current limiting device, monitoring a voltage at the capacitor bank, and, when the voltage at the capacitor bank reaches a threshold voltage value, ceasing the pre-charging process.

Variations and modifications can be made to these example embodiments of the present disclosure.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION OF THE INVENTION

Figure 1:
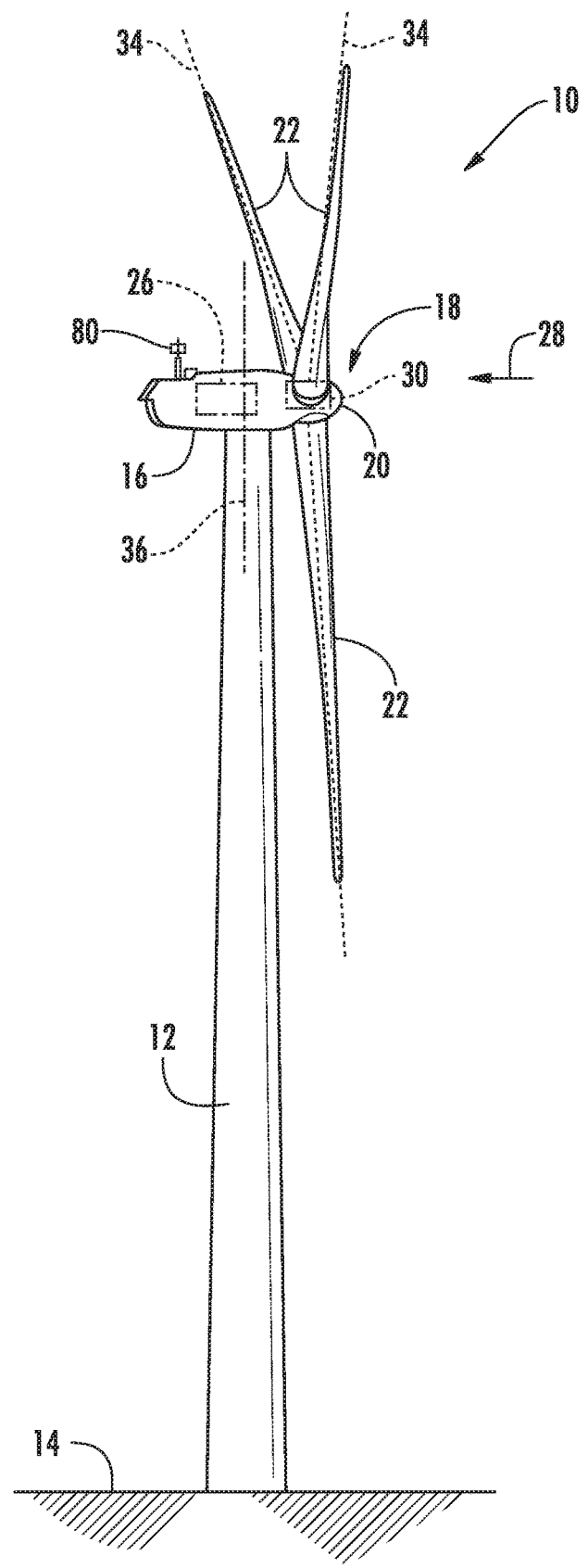
FIG. 1 depicts a perspective view of an example wind turbine according to example embodiments of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Example aspects of the present disclosure are directed to systems and methods of pre-charging a capacitor bank. For instance, a power switch and a current limiting device, such as an inductor device, can be coupled between a DC power source and a capacitor bank comprising one or more capacitor devices. Operation of the power switch can be controlled to limit the magnitude of a peak amount of charging current flowing through the current limiting device and into the capacitor bank. When the voltage at the capacitor bank reaches a threshold voltage level, the pre-charging process can be ceased. In this manner, a bypass contactor can be positioned such that, when the bypass contactor is closed, current does not flow through the pre-charging circuit (e.g. the power switch and the current limiting device).

More particularly, the power switch can be a pulse width modulation (PWM) controlled power switch, such as a metal-oxide-semiconductor field-effect transistor (MOSFET), IGBT, one or more contactors, a power relay, or other power switch. The current limiting device can be an inductor device. One or more control devices can drive power switch the gate of the MOSFET based at least in part on the magnitude of the current applied to the inductor. For instance, in embodiments wherein the power switch is a MOSFET, the one or more control devices can drive the gate of the MOSFET based at least in part on the magnitude of the current applied to the inductor. A current sensing device, such as a resistor, current transformer, current transducer, Hall-effect device, or other current sensing device can be coupled in series between the MOSFET and the inductor. The current sensing device can be configured to sense the current applied to the inductor and to provide a signal indicative of the magnitude of the current to the gate driving control device.

As indicated above, the gate driving control device can be configured to drive the gate of the MOSFET using PWM techniques. In this manner, the gate driving control device can be configured to adjust the duty cycle of the signal provided to the gate of the MOSFET based at least in part on the signal indicative of the magnitude of the current. As used herein, a duty cycle is a ratio between the duration that a signal pulse is in the active (e.g. high) state to the total modulation period of the signal. In particular, for each modulation period of the signal pulse, the gate driving control device can be configured to drive the signal pulse low when the sensed current reaches a current threshold, thereby turning the power switch off. In example embodiments, the current threshold can be between about 0.7 amperes and about 1.5 amperes. As used herein, the term "about," when used in conjunction with a numerical value is intended to refer to within 30% of the stated numerical value. When the power switch is turned off, current will not flow into the current limiting device. In this manner, at the start of the immediately subsequent modulation period, the signal pulse can be driven high, thereby turning the power switch on. With the power switch turned on, the current flowing through the current limiting device to the capacitor bank will begin to increase. When the current again reaches the current threshold, the signal pulse can be driven low, thereby turning the power switch off.

Throughout the pre-charging process, the voltage at the capacitor bank will increase. Such voltage at the capacitor bank can be monitored. The pre-charging process can be ceased when the voltage at the capacitor bank reaches a voltage threshold value. For instance, the voltage threshold value can be between about 60% and about 95% of the DC input voltage. In this manner, when the measured voltage at the capacitor bank reaches the threshold voltage value, a bypass contactor can be closed, such that current does not flow through the current limiting device.

With reference now to the figures, example embodiments of the present disclosure will be discussed in further detail. For instance, FIG. 1 depicts a perspective view of one embodiment of a wind turbine 10. As shown, the wind turbine 10 generally includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator positioned within the nacelle 16 to permit electrical energy to be produced.

The wind turbine 10 may also include a turbine control system including turbine controller 26 within the nacelle 16 or somewhere else associated with the wind turbine 10. In general, the turbine controller 26 may comprise one or more processing devices. Thus, in several embodiments, the turbine controller 26 may include suitable computer-readable instructions that, when executed by one or more processing devices, configure the controller 26 to perform various different functions, such as receiving, transmitting and/or executing wind turbine control signals. As such, the turbine controller 26 may generally be configured to control the various operating modes (e.g., start-up or shut-down sequences) and/or components of the wind turbine 10.

For example, the controller 26 may be configured to control the blade pitch or pitch angle of each of the rotor blades 22 (e.g. an angle that determines a perspective of the rotor blades 22 with respect to the direction 28 of the wind) to control the loading on the rotor blades 22 by adjusting an angular position of at least one rotor blade 22 relative to the wind. For instance, the turbine controller 26 may control the pitch angle of the rotor blades 22, either individually or simultaneously, by transmitting suitable control signals/commands to various pitch drivers or pitch adjustment mechanisms, such as pitch adjustment motor 32 (FIG. 2) of the wind turbine 10. Specifically, the rotor blades 22 may be rotatably mounted to the hub 20 by one or more pitch bearing(s) (not illustrated) such that the pitch angle may be adjusted by rotating the rotor blades 22 about their pitch axes 34 using the pitch adjustment motors 32.

Further, as the direction 28 of the wind changes, the turbine controller 26 may be configured to control a yaw direction of the nacelle 16 about a yaw axis 36 to position the rotor blades 22 with respect to the direction 28 of the wind, thereby controlling the loads acting on the wind turbine 10. For example, the turbine controller 26 may be configured to transmit control signals/commands to a yaw drive mechanism 38 (FIG. 2) of the wind turbine 10 such that the nacelle 16 may be rotated about the yaw axis 30.

Figure 2:
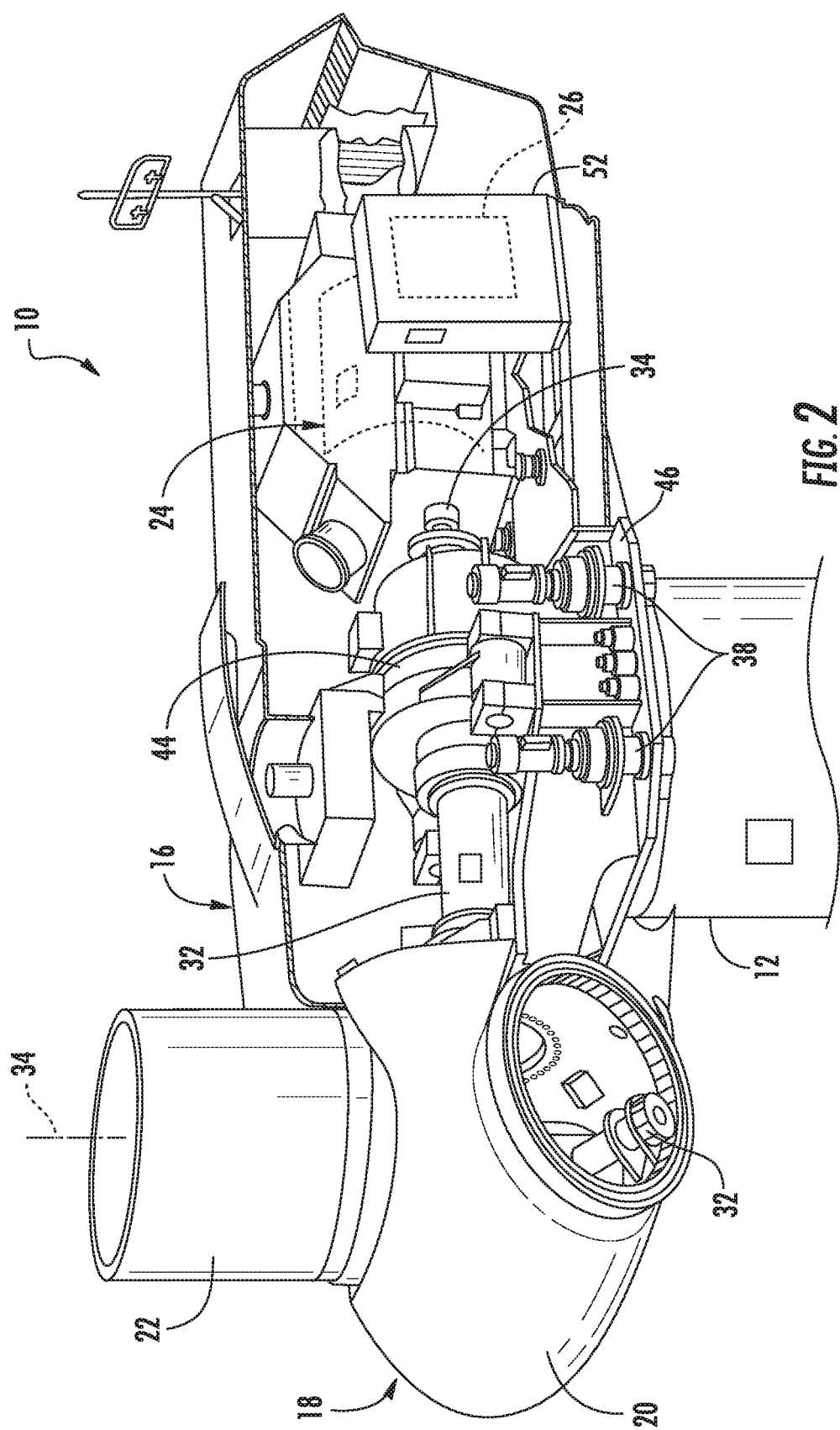
FIG. 2 depicts an internal view of an example nacelle of a wind turbine according to example embodiments of the present disclosure.

Still further, the turbine controller 26 may be configured to control the torque of a generator 24 (FIG. 2). For example, the turbine controller 26 may be configured to transmit control signals/commands to the generator 24 in order to modulate the magnetic flux produced within the generator 24, thus adjusting the torque demand on the generator 24. Such temporary de-rating of the generator 24 may reduce the rotational speed of the rotor blades 22, thereby reducing the aerodynamic loads acting on the blades 22 and the reaction loads on various other wind turbine 10 components.

FIG. 2 depicts a simplified, internal view of one embodiment of the nacelle 16 of the wind turbine 10. As shown, a generator 24 may be disposed within the nacelle 16. In general, the generator 24 may be coupled to the rotor 18 of the wind turbine 10 for generating electrical power from the rotational energy generated by the rotor 18. For example, the rotor 18 may include a main rotor shaft 40 coupled to the hub 20 for rotation therewith. The generator 24 may then be coupled to the rotor shaft 40 such that rotation of the rotor shaft 40 drives the generator 24. For instance, in the illustrated embodiment, the generator 24 includes a generator shaft 42 rotatably coupled to the rotor shaft 40 through a gearbox 44. However, in other embodiments, it should be appreciated that the generator shaft 42 may be rotatably coupled directly to the rotor shaft 40. Alternatively, the generator 24 may be directly rotatably coupled to the rotor shaft 40 (often referred to as a "direct-drive wind turbine").

It should be appreciated that the rotor shaft 40 may generally be supported within the nacelle by a support frame or bedplate 46 positioned atop the wind turbine tower 12. For example, the rotor shaft 40 may be supported by the bedplate 46 via a pair of pillow blocks mounted to the bedplate 46.

Additionally, as indicated herein, the turbine controller 26 may also be located within the nacelle 16 of the wind turbine 10. For example, as shown in the illustrated embodiment, the turbine controller 26 is disposed within a control cabinet 52 mounted to a portion of the nacelle 16. However, in other embodiments, the turbine controller 26 may be disposed at any other suitable location on and/or within the wind turbine 10 or at any suitable location remote to the wind turbine 10. Moreover, as described herein, the turbine controller 26 may also be communicatively coupled to various components of the wind turbine 10 for generally controlling the wind turbine and/or such components. For example, the turbine controller 26 may be communicatively coupled to the yaw drive mechanism(s) 38 of the wind turbine 10 for controlling and/or altering the yaw direction of the nacelle 16 relative to the direction 28 (FIG. 1) of the wind. Similarly, the turbine controller 26 may also be communicatively coupled to each pitch adjustment motor 32 of the wind turbine 10 (one of which is shown) for controlling and/or altering the pitch angle of the rotor blades 22 relative to the direction 28 of the wind. For instance, the turbine controller 26 may be configured to transmit a control signal/command to each pitch adjustment motor 32 such that one or more actuators (not shown) of the pitch adjustment motor 32 may be utilized to rotate the blades 22 relative to the hub 20.

Figure 3:
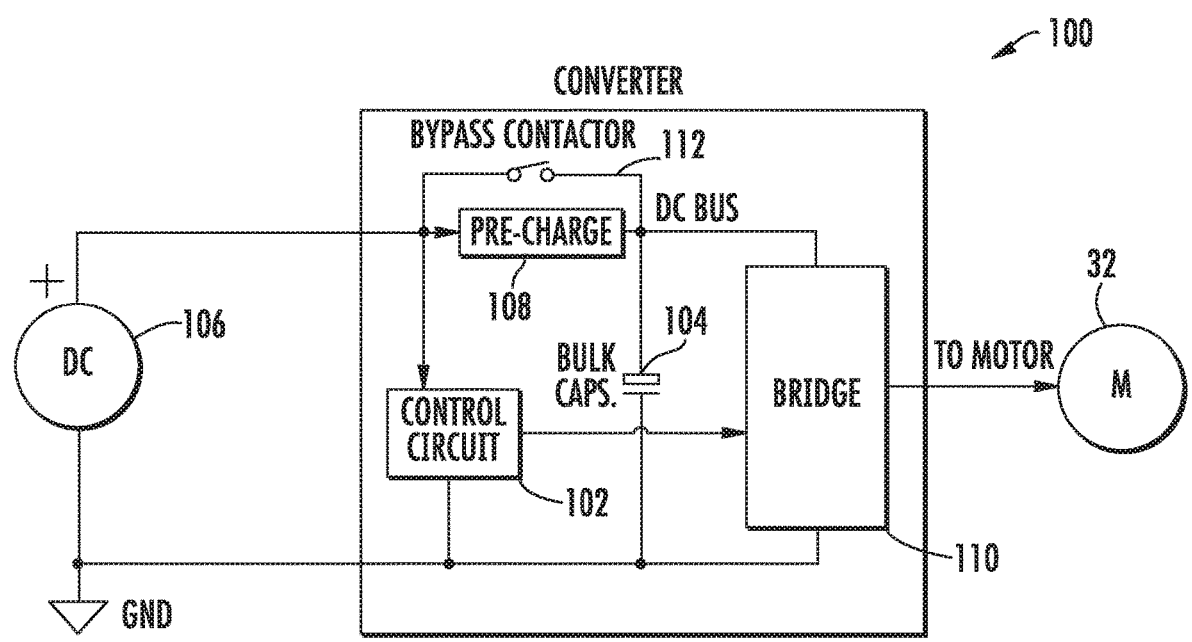
FIG. 3 depicts an overview of an example pitch angle adjustment motor control system according to example embodiments of the present disclosure.

FIG. 3 depicts an overview of an example system 100 for controlling a pitch adjustment motor 32 according to example embodiments of the present disclosure. As shown, system 100 can include a DC/DC converter 101. Converter 101 can include a control circuit 102. Control circuit 102 can include computer-readable instructions that when executed by one or more processors cause the one or more process to implement various control routines, such as implementation of a pre-charging process for a capacitor bank 104 associated with system 100. In example embodiments, control circuit 102 can correspond to turbine controller 26, or to a separate and distinct control device(s).

System 100 can further include a DC input source 106 configured to provide a DC voltage to pitch adjustment motor 32 through converter 101. In particular, source 106 can be configured to provide a DC voltage through a pre-charge circuit 108, and through an inverter bridge 110 to pitch adjustment motor 32. As indicated above, pre-charge circuit 108 can be configured to limit the magnitude of a current flowing to capacitor bank 104. Capacitor bank 104 can be configured to reduce a DC voltage ripple at pitch adjustment motor 32 while in operation. As will be described in more detail below, pre-charge circuit 108 can include one or more current limiting elements or devices configured to oppose a flow of current through pre-charge circuit 108. Pre-charge circuit 108 may further include one or more control devices configured to control operation of pre-charge circuit 108. In this manner, the one or more control devices may be separate and distinct devices from control circuit 102, or may be included within or otherwise associated with control circuit 102.

Converter 101 can be configured to direct current through pre-charge circuit 108 during one or more pre-charging processes. In this manner, converter 101 may further include a bypass contactor 112 to divert current flow around pre-charge circuit 108 when the pre-charging process is complete. For instance, control circuit 102 can be configured to cease the pre-charging process by providing a control command to close bypass contactor 112 when a voltage at capacitor bank 104 reaches a voltage threshold, thereby redirecting current flow through bypass contactor 112.

Figure 4:
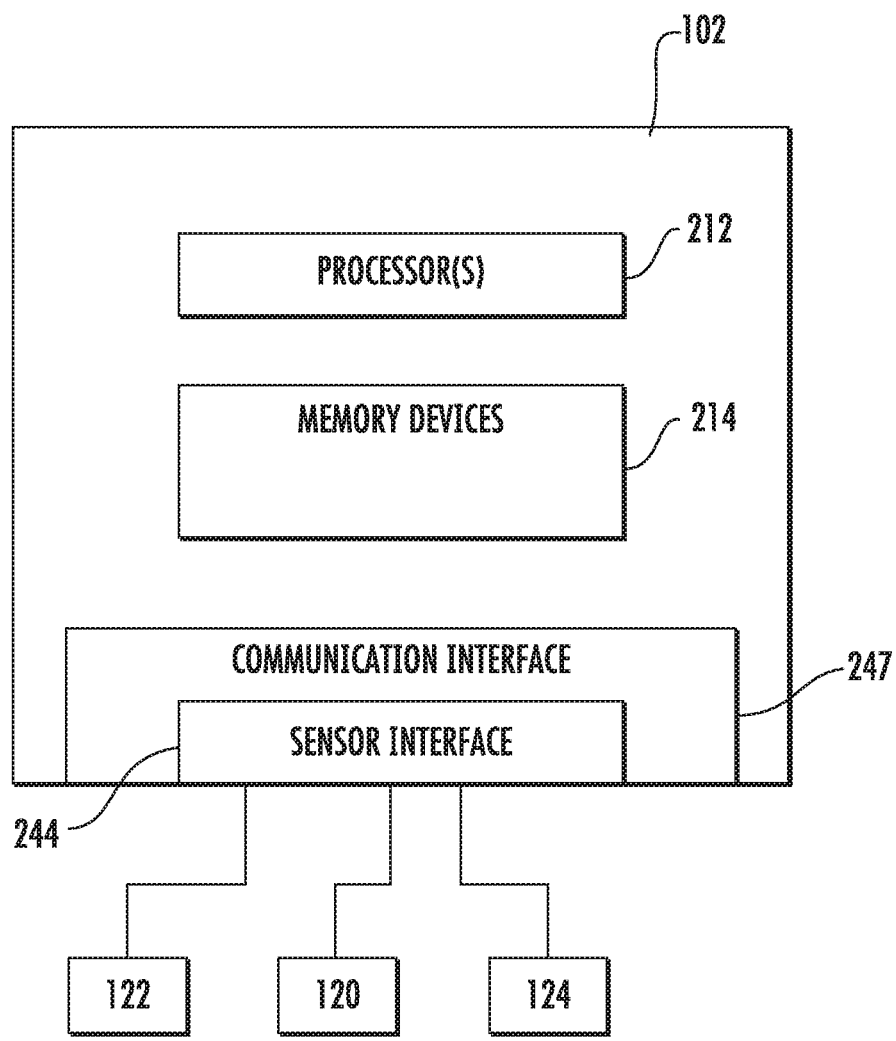
FIG. 4 depicts a block diagram of an example controller according to example embodiments of the present disclosure.

FIG. 4 depicts a block diagram of one embodiment of suitable components that may be included within control circuit 102 and/or the one or more control devices of pre-charge circuit 108 in accordance with example aspects of the present disclosure. As shown, the control circuit 102 may include one or more processor(s) 212 and associated memory device(s) 214 configured to perform a variety of computer-implemented functions (e.g., performing the methods, steps, calculations and the like disclosed herein).

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 214 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements.

Such memory device(s) 214 may generally be configured to store suitable computer-readable instructions that, when implemented by the processor(s) 212, configure control circuit 102 to perform various functions including, but not limited to, receiving directly or indirectly signals from one or more sensors (e.g. current sensors, wind speed sensors, turbine speed sensors) indicative of various input conditions, determining a capacitor bank voltage, controlling a pre-charge process of the capacitor bank, and/or various other suitable computer-implemented functions.

Additionally, control circuit 102 may also include a communications interface 247 to facilitate communications between control circuit 102 and the various components of the wind turbine 10. An interface can include one or more circuits, terminals, pins, contacts, conductors, or other components for sending and receiving control signals. Moreover, control circuit 102 may include a sensor interface 244 (e.g., one or more analog-to-digital converters) to permit signals transmitted from the sensors (e.g. sensors 120, 122, and 124) to be converted into signals that can be understood and processed by the processors 212.

Figure 5:
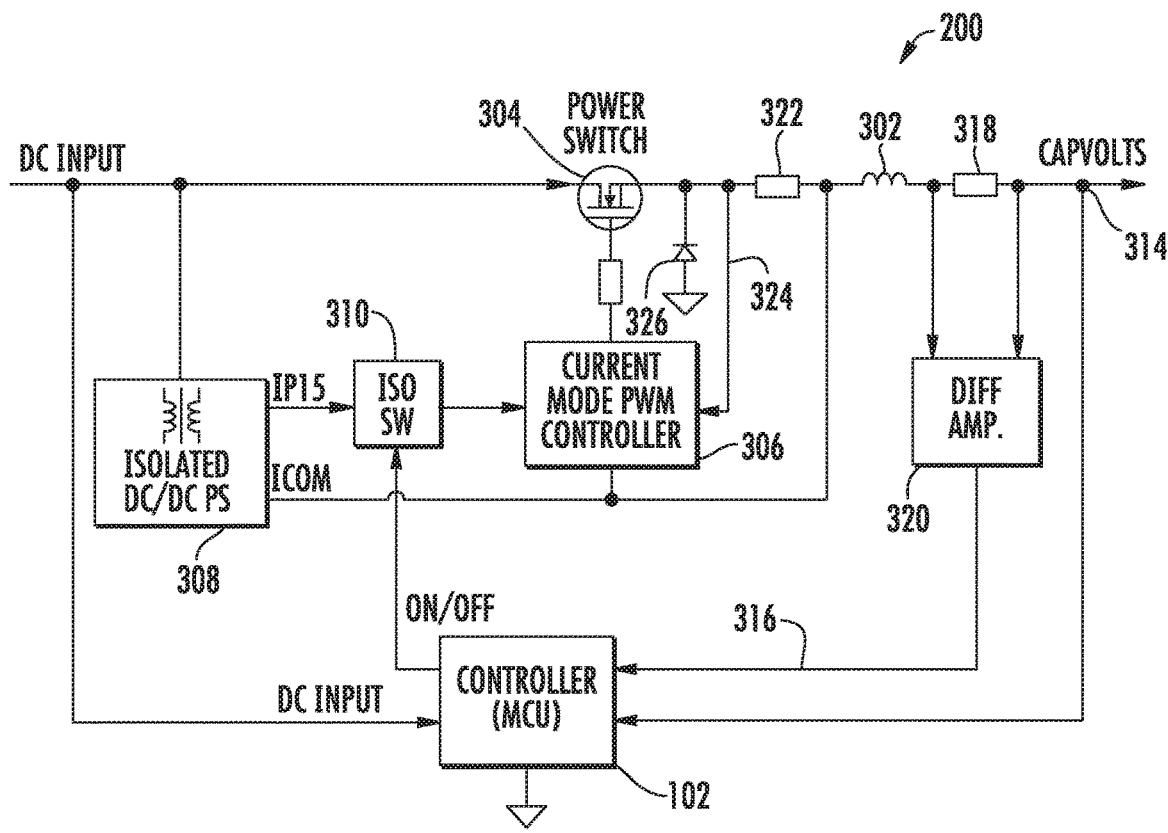
FIG. 5 depicts an overview of an example pre-charge control system for a capacitor bank according to example embodiments of the present disclosure.

FIG. 5 depicts an overview of an example system 200 for controlling a pre-charge circuit for a capacitor bank in a blade pitch driver according to example embodiments of the present disclosure. In particular, system 300 can correspond at least in part to pre-charge circuit 108 of FIG. 3. As indicated above, system 300 can include a current limiting device, such as inductor 302 coupled to a power switch 304. Power switch 304 can be driven by a pulse width modulation (PWM) signal provided by a control device 306. Control device 306 can include various suitable components, such as one or more of the components depicted with respect to control circuit 102 in FIG. 4. It will be appreciated that power switch 304 can be driven using various other suitable techniques. System 300 can further include an isolated DC/DC power supply 308 and/or converter configured to receive a voltage from DC input source 106 and to generate an isolated voltage signal (e.g. IP15) for control device 306. An isolated switch 310 can be coupled between control device 306 and power supply 308. Switch 310 can be an opto-coupler, a photo-relay, or various other suitable isolated switch. Switch 310 can be selectively operable in an open state and a closed state, and can be controlled or otherwise driven by control circuit 102 in accordance with example embodiments of the present disclosure.

In particular, control circuit 102 can be configured to control the state of switch 310 based at least in part on a capacitor bank voltage 314. For instance, a voltage at capacitor bank 104 can be monitored, sensed, and/or otherwise measured and a signal indicative of the voltage can be provided to control circuit 102. When the voltage 314 at capacitor bank 104 reaches a voltage threshold, control circuit 102 can be configured to provide one or more command signals to switch 310 that cause switch 310 to operate in the open state, thereby opening the circuit between power supply 308 and control device 306. Control circuit 102 can additionally be configured to provide a control command to bypass contactor 112 (e.g. as depicted in FIG. 3) to cause bypass contactor 112 to operate in a closed state.

Control circuit 102 can further be configured to determine a capacitance of capacitor bank 104. In this manner, control circuit can further receive a signal indicative of a charging current 316 applied to capacitor bank 104. In example embodiments, the signal indicative of the charging current 316 can be an average charging current applied to capacitor bank 104. As depicted, the charging current applied to capacitor bank 104 can be sensed using a current sensing device 318. Current sensing device 318 can include any suitable current sensing device, such as a resistor, current transformer, Hall-effect device, current transducer, or any other suitable current sensing device. A signal indicative of the charge current can be provided to control circuit 102 through a differential amplifier, such as differential operational amplifier (op-amp) 320. In this manner, differential op-amp 320 can be configured to convert a differential voltage signal provided by current sensing device 318 to a single ended signal 316, and to provide single ended signal 316 to control circuit 102. Control circuit 102 can then determine a capacitance of capacitor bank 104 at least in part from average current signal 316 and/or voltage 314.

As indicated above, control device 306 can be configured to limit the magnitude of the current flowing into inductor 302 during the pre-charging process. In this manner, a current sensing device 322 can be configured to monitor, measure and/or sense a current flowing into inductor 302 and to provide a signal 324 indicative of the current to control device 306. In alternative embodiments signal 324 can be sent through a filter, such as an RC filter, to reduce a level of noise associated with signal 324. Control device 306 can generate a pulse train and provide the pulse train to power switch 304, thereby causing power switch to turn on or off in accordance with the pulse train. In example embodiments, control device 306 can be configured to adjust a duty cycle of the pulse train based at least in part on current signal 324. In particular, control device 306 can be configured to drive the pulse signal low when current signal 324 reaches a current threshold, thereby causing power switch 304 to turn off or otherwise operate in an open state. At the initiation of the immediately subsequent modulation period, the pulse signal can be driven high until current signal 324 again reaches the current threshold. In this manner, for each modulation period of the pulse train generated by control device 306, power switch 304 can be turned on until the current flowing through power switch 304 reaches the current threshold. As will be described in more detail below with respect to FIG. 6, in embodiments wherein the current limiting device of the pre-charge circuit is an inductor device (e.g. inductor 302), when power switch 304 is turned off, current can discharge from inductor 302 causing the charging current applied to capacitor bank 104 to approximate an average current flowing through inductor 302. In such embodiments, the pre-charge circuit can further include a flyback diode 326 coupled between inductor 302 and ground. In this manner, flyback diode 326 can be used to flyback the charging current, when power switch 304 is turned off.

Figure 6:
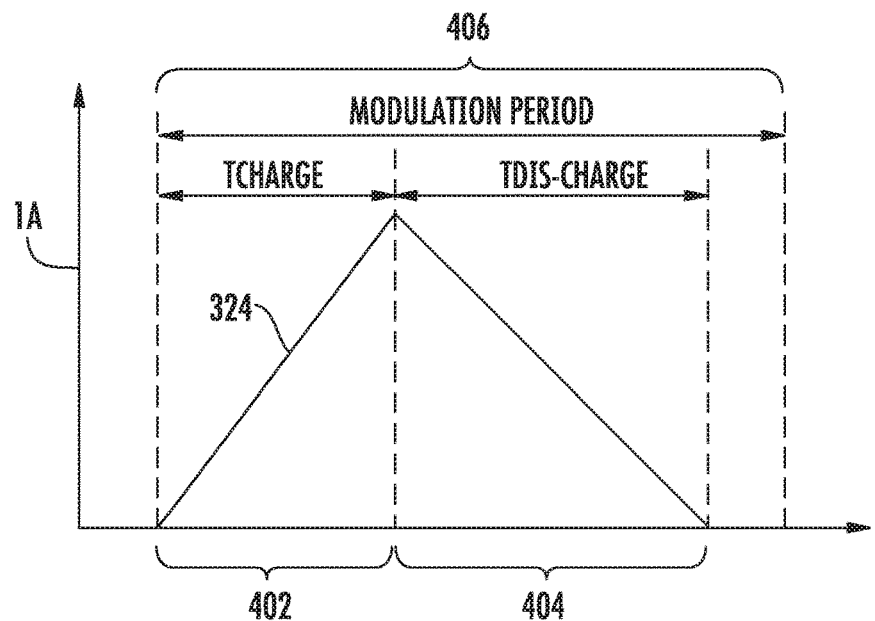
FIG. 6 depicts a plot of an example charge current applied to a capacitor bank according to example embodiments of the present disclosure.

FIG. 6 depicts a plot of an example current signal 324 of an inductive current limiting device according to example embodiments of the present disclosure. In particular, current signal 324 can include charge period 402 and a discharge period 404. Charge period 402 and discharge period 404 can occur at least in part during each modulation period 406 of the pulse train generated, for instance, by control device 306. It will be appreciated that the duration of modulation period 406 can be any suitable duration. In a particular implementation, the duration of modulation period 406 can be selected based at least in part on the value of the inductance of inductor 302.

As shown, charge period 402 can occur during an initial portion of modulation period 406. In particular, charge period 402 can occur when power switch 304 is turned on, thereby causing current to flow through inductor 302. The inductive properties of inductor 302 can cause inductor 302 to oppose the flow of current, thereby causing the current through inductor 302 to ramp up as inductor 302 stores energy. As indicated above, when current signal 324 reaches a current threshold (e.g. 1 ampere), control device 306 can cause power switch 304 to turn off, thereby cutting off the flow of current to inductor 302. Such occurrence can cause inductor 302 to begin discharging current in accordance with current signal 324 during discharge period 404. As shown, inductor 302 can discharge current until signal 324 reaches 0 amperes. Current signal 324 can then remain at 0 amperes until the beginning of the next modulation period when power switch 304 is turned on and inductor 302 begins to again store energy. In this manner, the load current (e.g. the average current applied to capacitor bank 104) can generally be about one half of the threshold current.

It will be appreciated however, that current signal 324 may not reach 0 amperes prior to the end of modulation period 406. In such occurrence, power switch 304 may still be turned on at the beginning of the next modulation period in accordance with example embodiments of the present disclosure.

Figure 7:
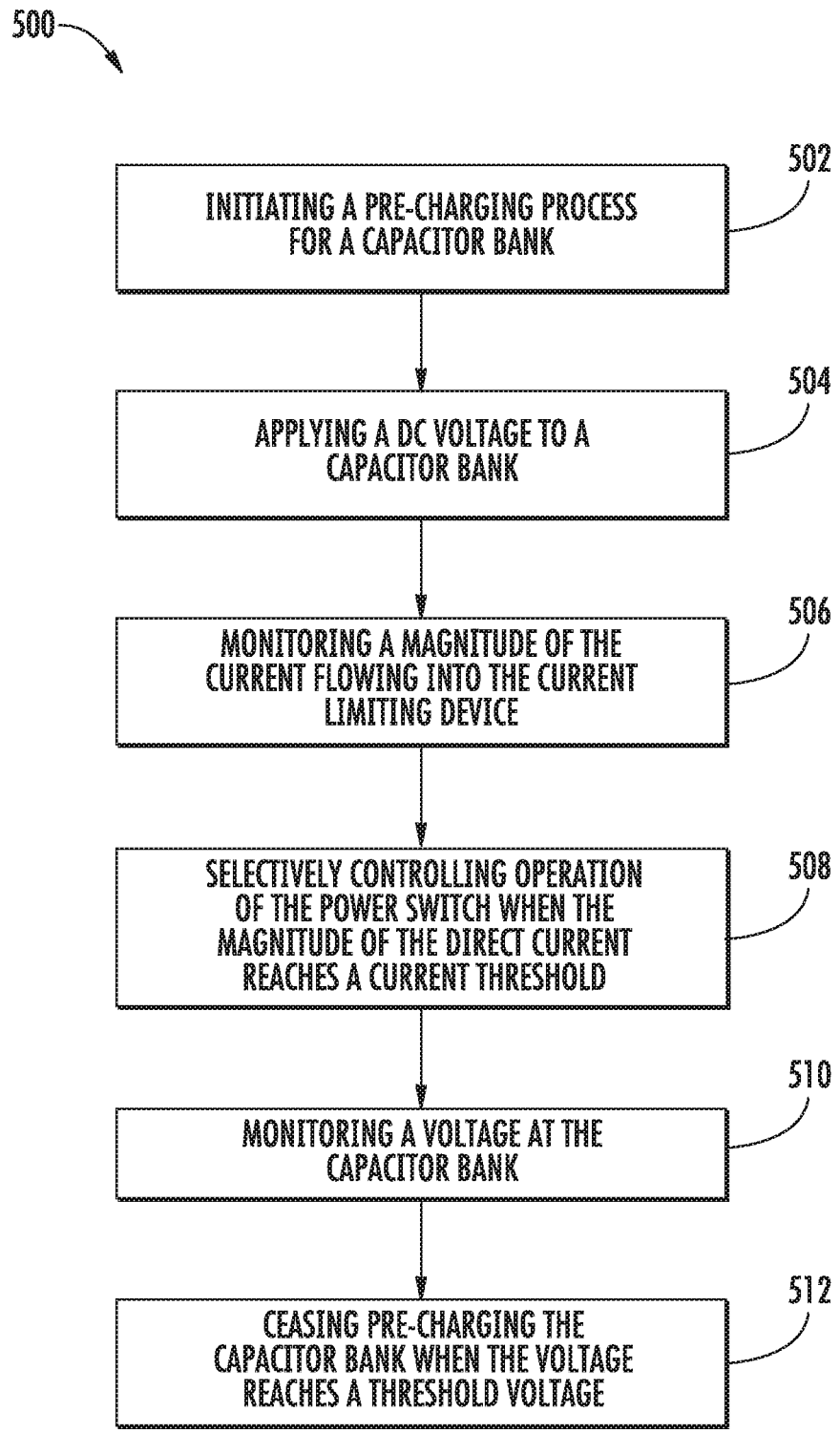
FIG. 7 depicts a flow diagram of an example method of pre-charging a capacitor bank according to example embodiments of the present disclosure.

FIG. 7 depicts a flow diagram of an example method (500) of pre-charging a capacitor bank according to example embodiments of the present disclosure. The method (500) can be implemented at least in part using one or more control devices, such as one or more of the controllers depicted in FIG. 5. In addition, FIG. 7 depicts steps performed in a particular order for purposes of illustration and discussion. Those of ordinary skill in the art, using the disclosures provided herein, will understand that the steps of any of the methods disclosed herein can be modified, expanded, omitted, rearranged, and/or adapted in various ways without deviating from the scope of the present disclosure.

At (502), method (500) can include initiating a pre-charging process for a capacitor bank. The capacitor bank can include one or more capacitor devices coupled in series and/or in parallel. The capacitor bank can be coupled to a power switch and a current limiting device. In particular, the power switch and the current liming device can be coupled in series between a power source and the capacitor bank. As indicated above, the power switch and the current limiting device can be configured to limit a peak amount of current applied to the capacitor bank.

At (504), method (500) can include applying a DC voltage for use in pre-charging the capacitor bank. The DC voltage can be supplied by the DC power source, and can be any suitable voltage level.

At (506), method (500) can include monitoring a magnitude of the current flowing into the current limiting device. In particular, in embodiments wherein the current limiting device is an inductor device, the current through the inductor device can increase over time for at least an initial time period. For instance, the current through the inductor can increase linearly with time. Such current can be monitored at least in part using a current sensing device, such as a current sensing resistor or other current sensing device. In particular, the current sensing device can be coupled in series between the power switch and the current limiting device. The current sensing device can provide a signal indicative of the current applied to the current limiting device to one or more control devices, such as one or more of the control devices of FIG. 5.

At (508), method (500) can include selectively controlling operation of the power switch based at least in part on the monitored current. In particular, the power switch may be controlled to turn off when the magnitude of the monitored current reaches a current threshold. For instance, the current threshold can be between about 0.7 amperes and 1.5 amperes. In example embodiments, the power switch can be driven using PWM techniques. In this manner, the duty cycle of a PWM signal applied to the power switch can be adjusted when the monitored current reaches the current threshold.

At (510), method (500) can include monitoring a voltage at the capacitor bank. For instance, the voltage at the capacitor bank can increase over time during the pre-charging process as current is applied to the capacitor bank. Such voltage can be monitored, and a signal indicative of the monitored voltage can be provided to one or more control devices.

At (512), method (500) can include ceasing pre-charging the capacitor bank when the voltage reaches a voltage threshold. In example embodiments, the voltage threshold can be determined to be between about 60% and 95% of the DC voltage supplied by the DC source. In this manner, when the voltage at the capacitor bank reaches the voltage threshold, power to the power switch driver can be cut off. Additionally or alternatively, when the voltage at the capacitor bank reaches the voltage threshold, a bypass contactor can be closed to divert current flow from the pre-charge circuit (e.g. power switch and current limiting device). For instance, the bypass contactor can be coupled in parallel to the pre-charge circuit. In this manner, current can flow through the bypass contactor to the capacitor bank.

Although example aspects of the present disclosure are discussed with reference to pre-charging a capacitor bank for use in a wind turbine system, it will be appreciated that such discussion is for illustrative purposes only. In particular, those of ordinary skill in the art, using the disclosures provided herein, will understand that the pre-charging techniques discussed herein can be used in various other suitable applications without deviating from the scope of the present disclosure. For instance, the pre-charging techniques described herein can be used in battery electric vehicle applications, electric power-assist systems, motorized bicycle applications, and/or various other suitable applications.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A system for pre-charging a capacitor bank, the system comprising:
   a power switch coupled in series to a direct current input source;
   a current limiting device coupled in series between the power switch and a capacitor bank comprising one or more capacitor devices;
   a first control device configured to control the operation of the power switch by:
      receiving one or more signals indicative of a charge current associated with the capacitor bank; and
      controlling operation of the power switch based at least in part on the charge current; and
   a second control device configured to determine a capacitor bank voltage at the capacitor bank and to control operation of the first control device based at least in part on the determined capacitor bank voltage.

2. The system of claim 1, wherein the power switch comprises a metal-oxide-semiconductor field-effect transistor.

3. The system of claim 1, wherein the current limiting device comprises an inductor device.

4. The system of claim 3, further comprising a flyback diode coupled between the power switch and ground.

5. The system of claim 1, wherein the first control device is a pulse width modulation controller, and wherein controlling the operation of the power switch based at least in part on the charge current comprises:
   comparing the received one or more signals indicative of the charge current to a threshold current value; and
   switching the power switch off when the signal indicative of the charge current reaches the threshold current value.

6. The system of claim 1, further comprising a DC/DC converter configured to provide a power input to the first control device.

7. The system of claim 6, further comprising an isolated switch coupled between the DC/DC converter and the first control device, and wherein the second control device controls the operation of the first control device by providing one or more control commands to the isolated switch.

8. The system of claim 1, wherein the second control device is further configured to determine a capacitance of the capacitor bank based at least in part on an average charge current and the determined voltage at the capacitor bank.

9. The system of claim 8, wherein the average charge current is determined using a current sensing element coupled to a differential operational amplifier.

10. The system of claim 1, wherein the second control device is configured to control the operation of the first control device based at least in part on the determined capacitor bank voltage by:
    comparing the determined capacitor bank voltage to a threshold voltage value; and
    ceasing operation of the first control device when the determined capacitor bank voltage reaches the threshold voltage value.

11. The system of claim 10, wherein the threshold voltage value is a percentage of an amount of voltage provided by the direct current input source.

12. The system of claim 10, further comprising a bypass contactor coupled in parallel with the power switch and current limiting device, such that when the bypass contactor is in a closed state, current from the direct current input source is directed through the bypass contactor.

13. The system of claim 12, wherein the second control device is further configured to control the operation of the bypass contactor such that the bypass contactor operates in the closed state when the capacitor bank voltage reaches the threshold voltage value.

14. The system of claim 1, wherein the one or more signals indicative of the charge current are determined using a current sensing element.

15. A control method of pre-charging a capacitor bank comprising one or more capacitor devices, the capacitor bank coupled in series with a power switch and a current limiting device between a power source and the capacitor bank, the method comprising:
    applying, by the power source, a direct current input for use in pre-charging the capacitor bank;
    monitoring, by a first control device, a magnitude of the direct current flowing into the current limiting device;
    selectively controlling, by the first control device, operation of the power switch such that, when the magnitude of direct current reaches a threshold current value, the power switch is turned off;
    monitoring, by a second control device, a voltage at the capacitor bank;
    controlling, by the second control device, operation of the first control device based, at least in part, on the voltage of the capacitor bank, and
    when the voltage at the capacitor bank reaches a threshold voltage value, ceasing pre-charging the capacitor bank such that the current limiting device is bypassed.

16. The control method of claim 15, wherein selectively controlling operation of the power switch such that, when the magnitude of direct current reaches a threshold current value, the power switch is turned off comprises adjusting a duty cycle of a pulse train associated with the power switch when the magnitude of direct current reaches the threshold current value.

17. The control method of claim 15, wherein ceasing pre-charging the capacitor bank comprises providing one or more control commands to a bypass contactor causing the bypass contactor to operate in a closed state.

* * * * *